UNITED STATES PATENT OFFICE.

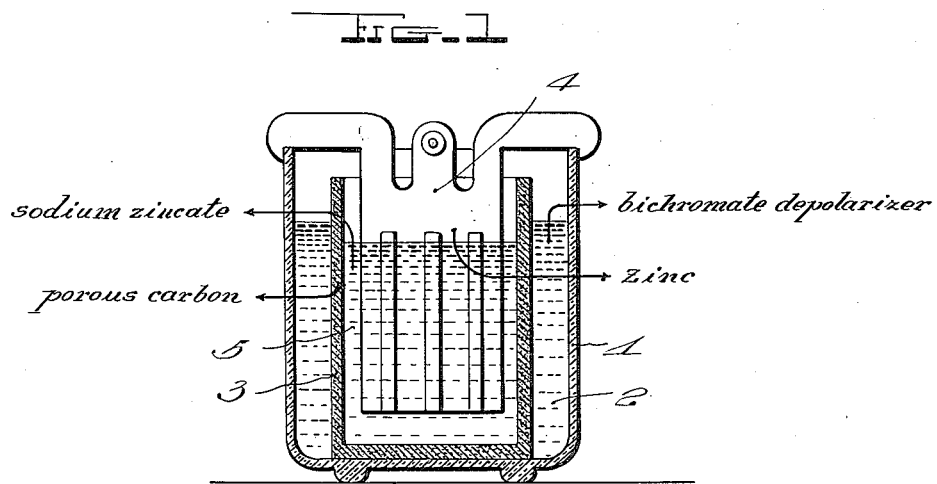
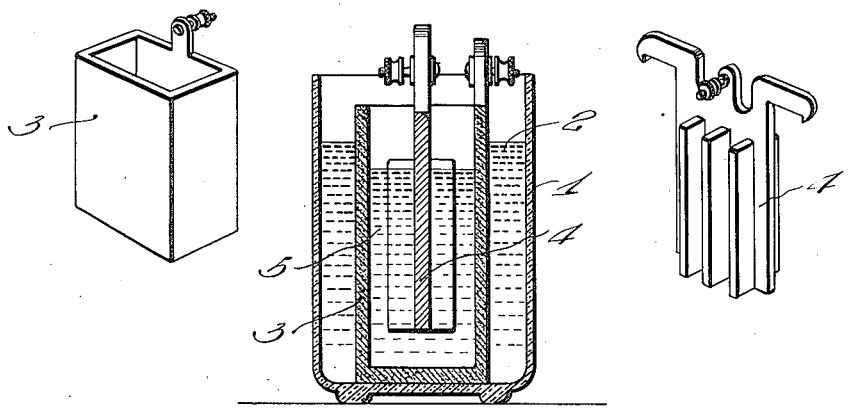

HARRY ELMER EVANS, OF BUFFALO, NEW YORK.

ELECTRIC CELL.

1,322,486.  Specification of Letters Patent.  Patented Nov. 18, 1919.

Application filed June 1, 1918. Serial No. 237,728.

*To all whom it may concern:*

Be it known that I, HARRY ELMER EVANS, a citizen of the United States, residing at Buffalo, in the county of Erie and State of New York, have invented certain new and useful Improvements in Electric Cells; and I do declare the following to be a full, clear, and exact description of the invention, such as will enable others skilled in the art to which it appertains to make and use the same.

My invention relates more particularly to electric primary cells and has for its object to provide a cell in which the electrolyte will not destroy the zinc or other negative electrode, said electrolyte, on the other hand, serving to increase the life of the electrode by depositing thereon a coating of the same material as that of which said electrode is formed.

With the foregoing object in view, the invention resides in the novel disclosure herein made and claimed.

In the accompanying drawing,

Figures 1 and 2 are vertical sections of a battery embodying the present invention; and Figs. 3 and 4 are perspective views of the positive and negative electrodes respectively.

In the drawing above briefly described, the numeral 1 designates a non-porous container of glass or the like having therein a depolarizing fluid 2 such as bichromate of potash with a small amount of sulfuric acid added. Immersed in the depolarizing fluid 2, is a positive electrode in the form of a porous carbon cup 3, and by suitable means, a negative electrode 4 of zinc or other preferred material is suspended within the cup 3. The cup contains an electrolyte 5 which carries, in solution, the same material as that of which the negative electrode is formed. For instance, when forming the electrode 4 of zinc, sodium zincate is used for the electrolyte 5. This zincate may be formed in a number of ways well known, but the following are two examples.

Caustic soda is melted and zinc powder added, so that the two will fuse and form a solid or powder, which solid or powder is used by forming a saturated solution therewith.

Another manner of forming the electrolyte is to use a strong solution of caustic soda and add zinc oxid until the solution has dissolved all that it will carry, sufficient oxid being used to form a saturated solution.

The cell has been successfully used employing a zinc electrode and sodium zincate as the electrolyte; and it has been found that when the battery is exhausted or "run down," the zinc electrode is coated with zinc from the sodium zincate solution. It will thus be seen that rather than decreasing the life of the negative electrode and often requiring the installation of a new one, the use of an electrolyte as specified, will add to the negative electrode, increasing its weight and life.

Since probably the best results are obtained from the features herein disclosed, they are by preference used, but within the scope of the invention as claimed, considerable latitude is allowed.

I claim:

An electric cell comprising a receptacle and a depolarizing fluid therein, a positive electrode in the form of a porous carbon cup immersed in said depolarizing fluid, a negative electrode in said cup, and an electrolyte in said cup containing, in solution, the same material as that of which said negative electrode is formed.

In testimony whereof I have hereunto set my hand.

HARRY ELMER EVANS.